United States Patent
Munder

(10) Patent No.: US 7,278,612 B1
(45) Date of Patent: Oct. 9, 2007

(54) SWAGED CABLE DEPLOYMENT IN SPACE

(75) Inventor: Joseph C. Munder, Doylestown, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 497 days.

(21) Appl. No.: 11/000,776

(22) Filed: Dec. 1, 2004

Related U.S. Application Data

(60) Provisional application No. 60/527,176, filed on Dec. 5, 2003.

(51) Int. Cl.
*B64G 1/40* (2006.01)

(52) U.S. Cl. ............... 244/172.6; 244/172.9; 244/173.3; 89/1.57; 83/167; 30/90.1

(58) Field of Classification Search ............ 244/172.6, 244/172.9, 173.3; 89/1.57; 83/167, 451, 83/78; 30/90.1, 90.2
See application file for complete search history.

(56) References Cited

U.S. PATENT DOCUMENTS

| | | | |
|---|---|---|---|
| 3,810,671 A * | 5/1974 | Jeffery | 294/82.29 |
| 3,991,649 A * | 11/1976 | Patrichi | 89/1.14 |
| 4,373,690 A * | 2/1983 | Stillman et al. | 244/172.6 |
| 4,495,849 A | 1/1985 | Cooke et al. | 89/1.14 |
| 4,540,873 A | 9/1985 | Kester | 219/200 |
| 5,060,888 A | 10/1991 | Vezain et al. | 244/158 R |
| 6,076,467 A * | 6/2000 | Cespedosa et al. | 102/378 |
| 6,299,105 B1 | 10/2001 | Gilmore | 244/158 R |
| 6,439,122 B1 * | 8/2002 | Nygren et al. | 102/377 |

* cited by examiner

*Primary Examiner*—J. Woodrow Eldred
(74) *Attorney, Agent, or Firm*—Marsh Fischmann & Breyfogle LLP

(57) ABSTRACT

A cable restraint/deployment mechanism is disclosed for deploying an object in space from a spacecraft. To deploy the object, the cable restraint/deployment mechanism cuts a cable attached to the spacecraft and the object. For example, a spacecraft may include a solar panel array that is restrained by the spacecraft in a stowed form through the use of a wire rope cable. The cable may be affixed at one end to a deployable object. The other end of the cable is affixed to the spacecraft through a cutting mechanism, such as a pyrotechnically actuated cutting device. The cutting mechanism cuts the cable at a swaged sleeve of the cable. The swaged sleeve of the cable substantially prevents splaying of the cable and cutting debris.

44 Claims, 9 Drawing Sheets

SWAGED CABLE DEPLOYMENT IN SPACE

CROSS REFERENCE TO RELATED APPLICATIONS

This patent application is related and claims priority to U.S. Provisional Patent Application No. 60/527,176 that is entitled "Copper Sleeved Restraint Cables", that was filed Dec. 5, 2003 and the entire contents of which are incorporated by reference herein.

FIELD OF THE INVENTION

The present invention generally relates to the field of deploying objects in space and, more particularly, to a cable restraint and deployment system for operably deploying an object such as an antenna array or a solar panel array from a spacecraft.

BACKGROUND OF THE INVENTION

Cable restraint/deployment systems exist in a variety of configurations for deploying an object in space. Typically these restraint/deployment systems use a wire rope cable with one end affixed to a spacecraft and the other end affixed to a deployable object, such as a solar panel array of the spacecraft. For example, the solar panel array of the spacecraft may be delivered in space in a stowed form wherein the panels of the array are folded upon one another and restrained with a wire rope cable. The cable is typically threaded through the panels of the array and affixed to an end panel, or outermost panel, of the array. The other end of the cable is affixed to the spacecraft through a cutting device used to sever the cable and allow the panels to unfold when deployed.

When a wire rope cable is cut, the cable has a tendency to splay (i.e., unravel). Prior methods of preparing a cable for cutting included soldering a portion of the cable such that when the cable was cut at the soldered portion, the solder would retain the integrity of the cable. While marginally effective at preventing splaying, the solder would often create a large amount of debris when the cable was cut. In space, debris is not desirable because, among other things, the debris can interfere with or even damage the spacecraft and/or the deployable. Wire rope cable of the above noted type is often made from steel. Applying solder to steel requires that the steel be cleaned such that few impurities remain. Most solvents that are capable of cleaning steel in such a manner are ozone-depleting chemicals ("ODC"). Because of environmental issues, restrictions have been placed on the use of ozone-depleting chemicals. These restrictions make cleaning steel cables for subsequent soldering prohibitively expensive.

BRIEF SUMMARY OF THE INVENTION

A first aspect of the invention is generally directed to a system for operating a spacecraft and, more particularly, to deploying to an object in space. The spacecraft includes a spacecraft body and a deployable releasably interconnected with the spacecraft body. A cable interfaces with the deployable to retain the deployable in a first position. The cable extends through a sleeve that is swaged onto the cable. The spacecraft also includes a cutting device aligned with the sleeve. Activation of the cutting device directs the cutting device through both the sleeve and the cable to release the deployable from the first position.

The deployable may move from the first position to a second position, and remains interconnected with the spacecraft body, after the activation of the cutting device. For example, the deployable may be an antenna or a solar panel that is deployed, yet remains connected to the spacecraft body. Alternatively, the deployable may be jettisoned from the spacecraft body after the activation of the cutting device. For example, the deployable may be a faring or a satellite that is cut loose from the spacecraft body.

The sleeve may be a material such as copper, a malleable metal or an extrudable substance. The cable may be in the form of a wire rope cable comprising a plurality of individual wires. The sleeve may be swaged onto the cable so as to deform the sleeve into intimate contact with an exterior surface of the cable and provide a mechanical bond between the wires and the sleeve. The mechanical bond may be stronger than the material of the sleeve. For example, a force required to pull the sleeve from the cable may result in a tear of the sleeve material. Additionally, the mechanical bond created by swaging may be achieved without the use of an ozone-depleting chemical on the cable prior to the swaging process.

Swaging the sleeve onto the cable allows the cable to be severed with substantially no splaying. Moreover, swaging the sleeve onto the cable allows the cable to be severed with substantially no debris being generated. Swaging of the sleeve onto the cable may be performed using a hydraulic press forming die. The wall thickness may be subsequently reduced so as to reduce snagging of the sleeve through, for example, a guidehole.

A second aspect of the invention is generally directed to a method of operating a spacecraft. The method includes the steps of swaging a sleeve onto a cable and using the cable to retain a deployable in a first position relative to the spacecraft. The method further includes the step of severing both the sleeve and the cable and releasing the deployable from the first position in response to the step of severing.

A third aspect of the invention is generally directed to a method of operating a spacecraft. The method includes the steps of retaining a deployable in a first position relative to the spacecraft with a cable having a swaged sleeve. The method also includes a step of deploying the deployable by severing both the swaged sleeve and the cable, and releasing the deployable from the first position in response to the step of severing.

A fourth aspect of the invention is generally directed to a method of deploying an object in space. The method includes the steps of guiding a cable through a cutting mechanism that is affixed to a spacecraft. The cable has a swaged portion. The method also includes firing a cutting blade against the swaged portion of the cable and severing the cable to provide a first severed end of the cable with a first part of the swaged portion of the cable. The step of severing produces substantially no splaying of the cable. The method also includes moving the object from the spacecraft in response to the step of severing the cable.

To deploy the object, such as a solar panel array, the spacecraft uses a cable restraint/deployment mechanism, which operates by cutting a cable that restrains the object. For example, a spacecraft may include a solar panel array that is restrained by the spacecraft in a stowed form using a wire rope cable. Panels of the solar panel array may be folded upon one another in an accordion-like fashion. The solar panels may be restrained by the wire rope cable threading the cable through the "stack" of panels and affixing the cable between the spacecraft and an outermost panel of the array. Alternatively, the cable may be a "wrap cable" that is wrapped about the spacecraft and the solar panel array, affixed to itself and passing through the cutting device.

The wire rope cable may be affixed at one end to a deployable object (e.g., an outermost panel of a solar panel array). The other end of the cable may be affixed to the spacecraft through a cutting mechanism. For example, the cable may be threaded through a cutting chamber that includes one or more cutting devices (e.g., a plurality of cutting devices may be used for redundancy purposes). These cutting devices physically cut the cable when actuated. One general example of such a cutting device is pyrotechnically actuated cutter, which uses an explosive charge to drive a piston/blade towards an anvil and through the cable. However, other cutting devices that "physically" cut the cable may be used. One example of such a cutting device is shown and described in U.S. Pat. No. 5,344,506 (issued Sep. 6, 1994; hereinafter referred to as the "'506 patent").

When a physical cutter is used to cut a wire rope cable, the wires (i.e., strands) of the cable tend to splay or unravel. To substantially eliminate such splaying of the cable, the wire rope cable that may be used by the present invention has a sleeve that is swaged onto a portion of the cable. The swaging of the sleeve onto the cable causes the sleeve to compress into the "grooves of the wire rope and form a mechanical bond to the cable. The swaged sleeve maintains the integrity of the wire rope cable when the cable is cut through the sleeve. For example, the swaged sleeve performs as a band that restrains the wires of the cable from splaying when the cable is cut because of the mechanical bond between the sleeve and the wires of the cable.

The swaged portion of the wire rope cable is preferably a malleable metal such as copper. The sleeve is swaged onto the cable with a force that forms a mechanical bond between the sleeve and the cable. The resultant mechanical bond may become stronger than the material of the sleeve itself. For example, the mechanical bond is so strong that removing the sleeve from the cable would require tearing the sleeve. The mechanical bond of the sleeve to the cable substantially prevents cable splaying and substantially reduces the amount of debris that typically result from cutting a wire rope cable. In addition to the reduced debris and splaying, the swaging process typically requires less cleaning of the wire rope cable and specifically eliminates the need to clean the cable with an ODC.

Although described with respect to a spacecraft embodiment having an object deployed by cable restraint/deployment mechanism of the spacecraft, those skilled in the art should readily recognize that the restraint/deployment mechanism of the present invention may be used in other systems to prevent splaying of the wire rope cable. For example, wire rope cables are used in other industries, such as the petroleum industry, wherein a cable restraint/deployment mechanism of the present invention can be used to deploy an oil rig platform underwater. These other industries may also find it beneficial to prevent splaying of the wire rope cable when cut. The invention, therefore, should not be limited to a particular industry use.

Additionally, those skilled in the art should readily recognize that other embodiments may fall within the scope and spirit of the invention. Accordingly, the invention is not intended to be limited to the preferred embodiment shown and described hereinbelow.

BRIEF DESCRIPTION OF THE INVENTION AND THE SEVERAL VIEWS OF THE DRAWINGS

DETAILED DESCRIPTION OF THE INVENTION

Figure 1A:
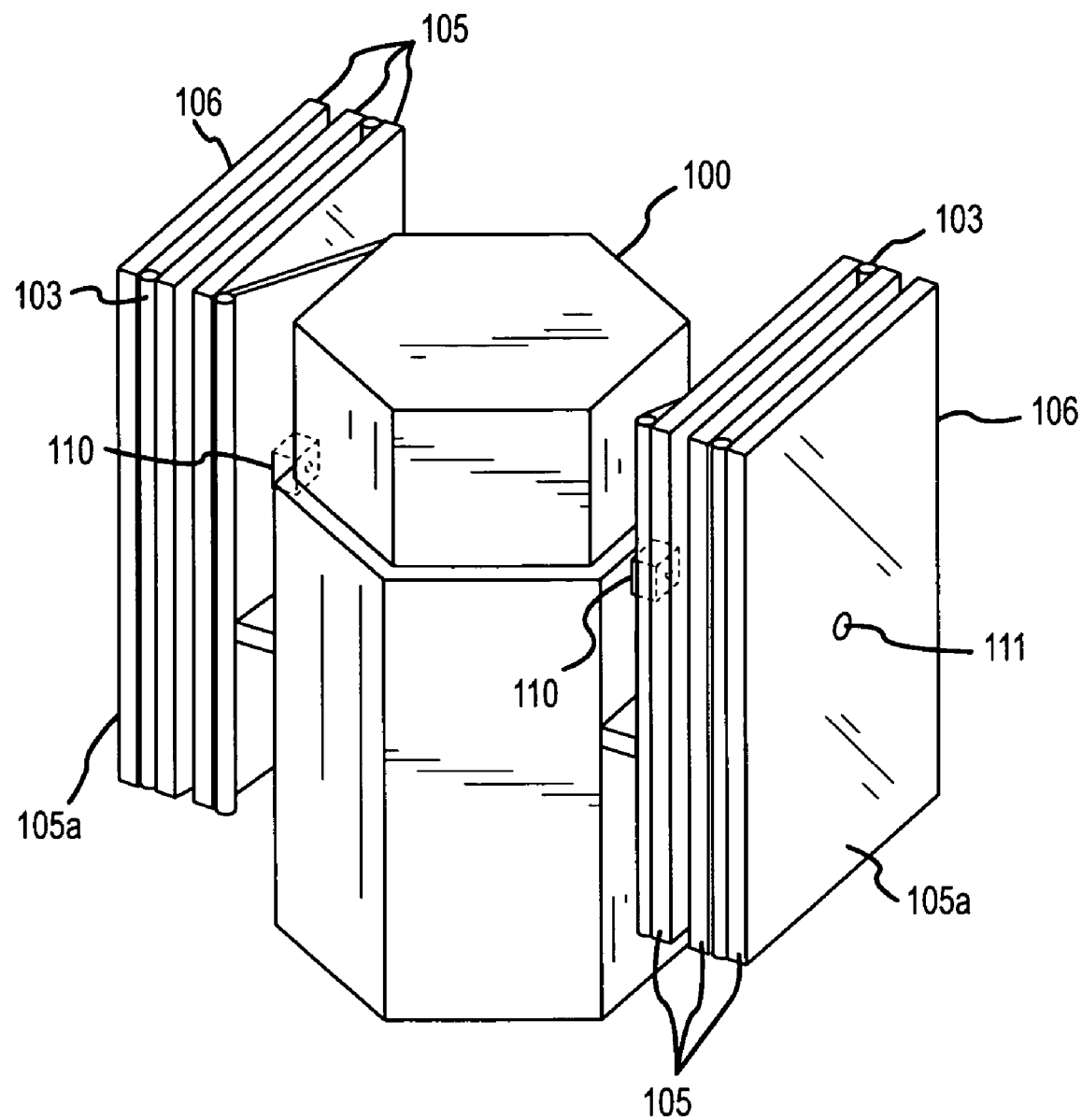
FIGS. 1a and 1b are perspective views of a spacecraft with a solar panel array restrained in a stowed position by a cable restraint/deployment mechanism.
Figure 1B:
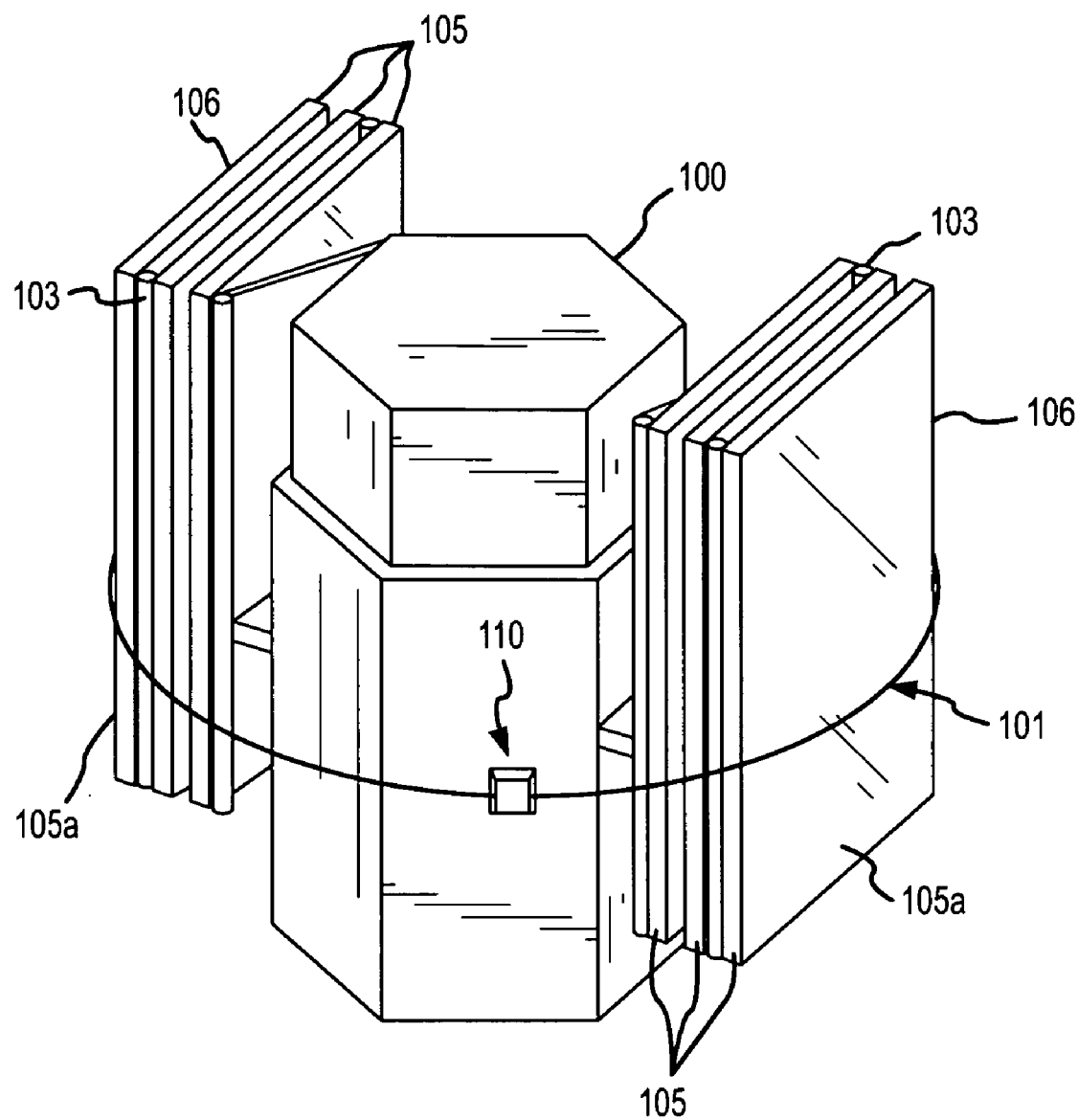
Figure 2:
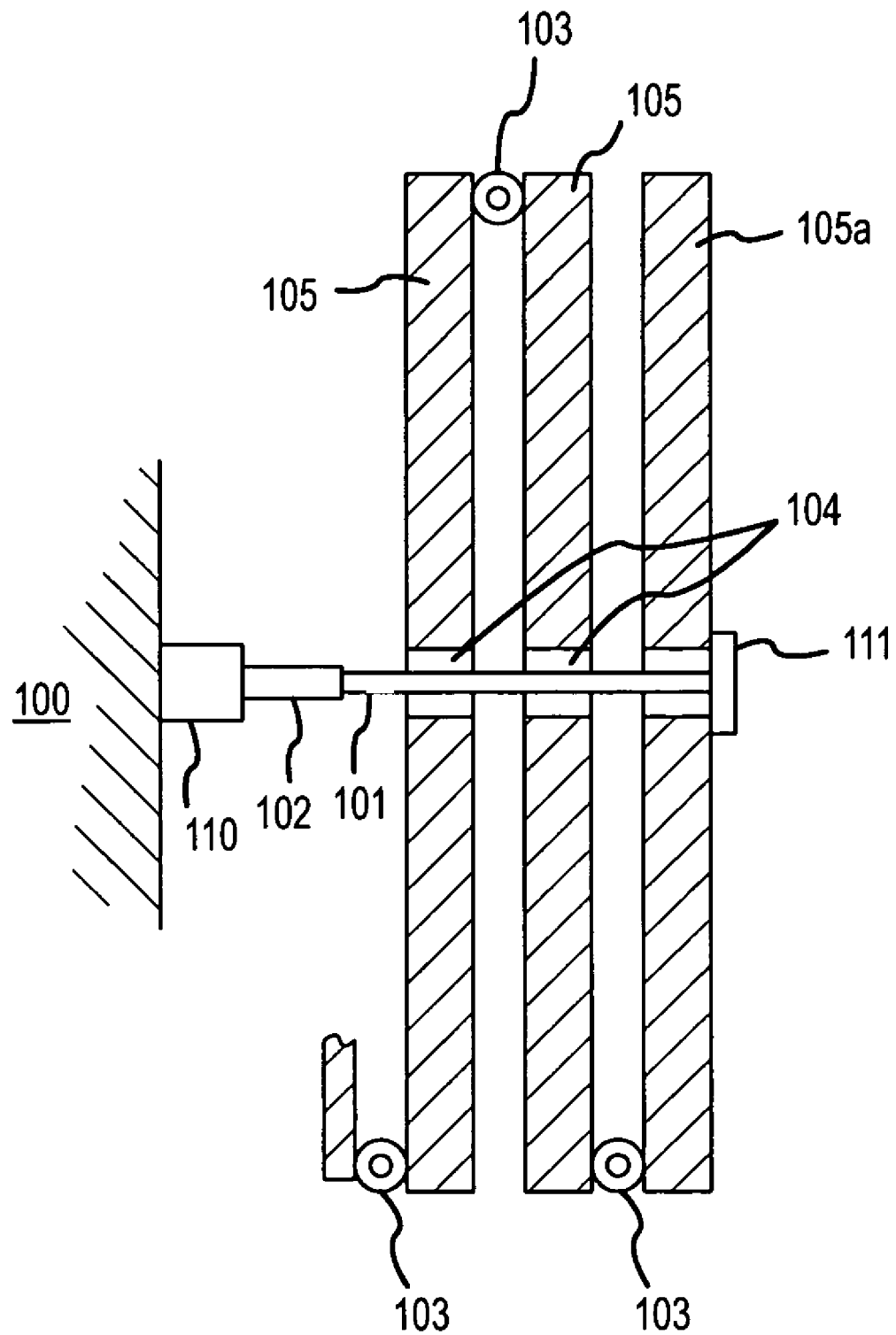
FIG. 2 is a cross-sectional view of the panels of the solar panel array of FIG. 1a in the stowed position.

FIGS. 1a, 1b and 2 illustrate a spacecraft 100 with a solar panel array 106 restrained by a cable restraint/deployment mechanism 110. FIGS. 1a and 1b are perspective views of spacecraft 100 with solar panel array 106 restrained in a stowed position by cable restraint/deployment mechanism 110. In this embodiment, the stowed position is such that panels 105 of array 106 are folded upon one another. Cable restraint/deployment mechanism 110 may restrain the panels 105, for example, until placement of spacecraft 100 in an orbit. Upon placement in orbit, spacecraft 100 may deploy the solar panel array 106 using cable restraint/deployment mechanism 110.

The cable restraint/deployment mechanism 110 uses cable 101 (shown below in FIGS. 2 and 3) to restrain solar panel array 106 until deployment. In this embodiment, cable 101 is a wire rope cable as is well-known to those skilled in the art. Cable 101 is threaded through panels 105 via cable guides 104 and is affixed at one end to the outermost panel 105a of array 106. The other end of cable 101 may be restrained by restraint/deployment mechanism 110 or by attachment to any appropriate portion of the spacecraft 100. The restraint/deployment mechanism 110 may include a reeling mechanism that allows cable 101 to "unreel" to a certain length. Alternatively, cable 101 may be affixed to the spacecraft 100 using a locking mechanism that clamps onto an end of cable 101. For example, cable 101 may have a "bolt-like" structure affixed to the end of cable 101 such that a locking mechanism affixed to the spacecraft may clamp on to the bolt-like structure and restrain array 106. Alternatively, cable 101 may be wrapped around the spacecraft 100 and solar panel array 106, affixed to itself and passing through cable restraint/deployment mechanism 110, as illustrated in FIG. 1b. However, there may be other ways to use cable 101 to restrain the solar panel array 106 until deployment is desired.

To deploy solar panel array panels 105, cable restraint/deployment mechanism 110 severs cable 101 with cutting device 203 (i.e., as illustrated below in FIGS. 4 and 5), thereby severing the restraint of the solar panel array 106 by the cable restraint/deployment mechanism 110. Upon cutting cable 101, spacecraft 100 may deploy solar panel array 106. Such a cut/release deployment is well-known to those skilled in the art. For example, solar panel array 106 may comprise an electromechanical device that is actuated by spacecraft 100 and/or by an external control communication to spacecraft 100 to deploy array 106.

Cutting device 203 may be substantially any type of physical cutting device capable of cutting cable 101. For example, physical cutting device 203 may be a pyrotechnically actuated cutting device with an explosive charge used to drive a "bladed" piston towards an anvil and through cable 101. Cutting device 203 severs cable 101 into two portions, one of which remains affixed to spacecraft 100 and the other of which remains affixed to the outermost panel 105a of solar panel array 106.

Prior methods of physically cutting cable 101 often resulted in cable splaying or unraveling because mechanical bonding of the individual cable 101 wires was difficult to achieve. Accordingly, cable 101 is configured with a sleeve 102 (i.e., illustrated below in FIGS. 2-5) that is swaged onto a portion of cable 101 to mechanically bond the individual wires together. The swaged sleeve 102 maintains the integrity of cable 101 by substantially preventing splaying of the individual wires when cable 101 is cut. Additionally, the swaged sleeve 102 may reduce debris as compared to the prior art because the sleeve 102 forms a stronger and more cohesive mechanical bond to the individual wires than that produced by prior art soldering methods.

FIG. 2 is a cross-sectional view of panels 105 of solar panel array 106 of FIG. 1 in the stowed position. This drawing illustrates the deployable functionality of the solar panel array 106. For example, solar panel array 106 is restrained by cable restraint/deployment mechanism 110 using cable 101 with a swaged sleeve 102. When the cable 101 is cut by cable restraint/deployment mechanism 110, panels of array 106 are allowed to unfold at hinges 103.

As illustrated herein, cable 101 is affixed to the outermost panel 105a from spacecraft 100 at affixing point 111. From there cable 101 is threaded through cable guides 104 and to cable restraint/deployment mechanism 110. The cable guides 104 may be preconfigured holes within panels 105 of solar panel array 106 that guide cable 101 through panels 105 of array 106. For example, each solar panel 105 of solar panel array 106 may have a hole positioned in such a way that when the panels 105 are folded upon themselves the holes align. Accordingly, cable 101 does not require bending as it guides through the solar panel array 106.

The swaged sleeve 102 is positioned on cable 101 at a point where cutting mechanism 203 of cable restraint/deployment mechanism 110 may sever cable 101. Once cut by cutting mechanism 203 of FIG. 3, the portion of cable 101 that is affixed to the solar panel array 106 remains with the outermost panel 105a. As the panels 105 of solar panel array 106 unfold, the portion of cable 101 remaining with array 106 is pulled through cable guides 104. Because of the stiffness of a typical cable, the affixed remaining portion of cable 101 tends to outwardly project from the outermost panel 105a.

Figure 3:
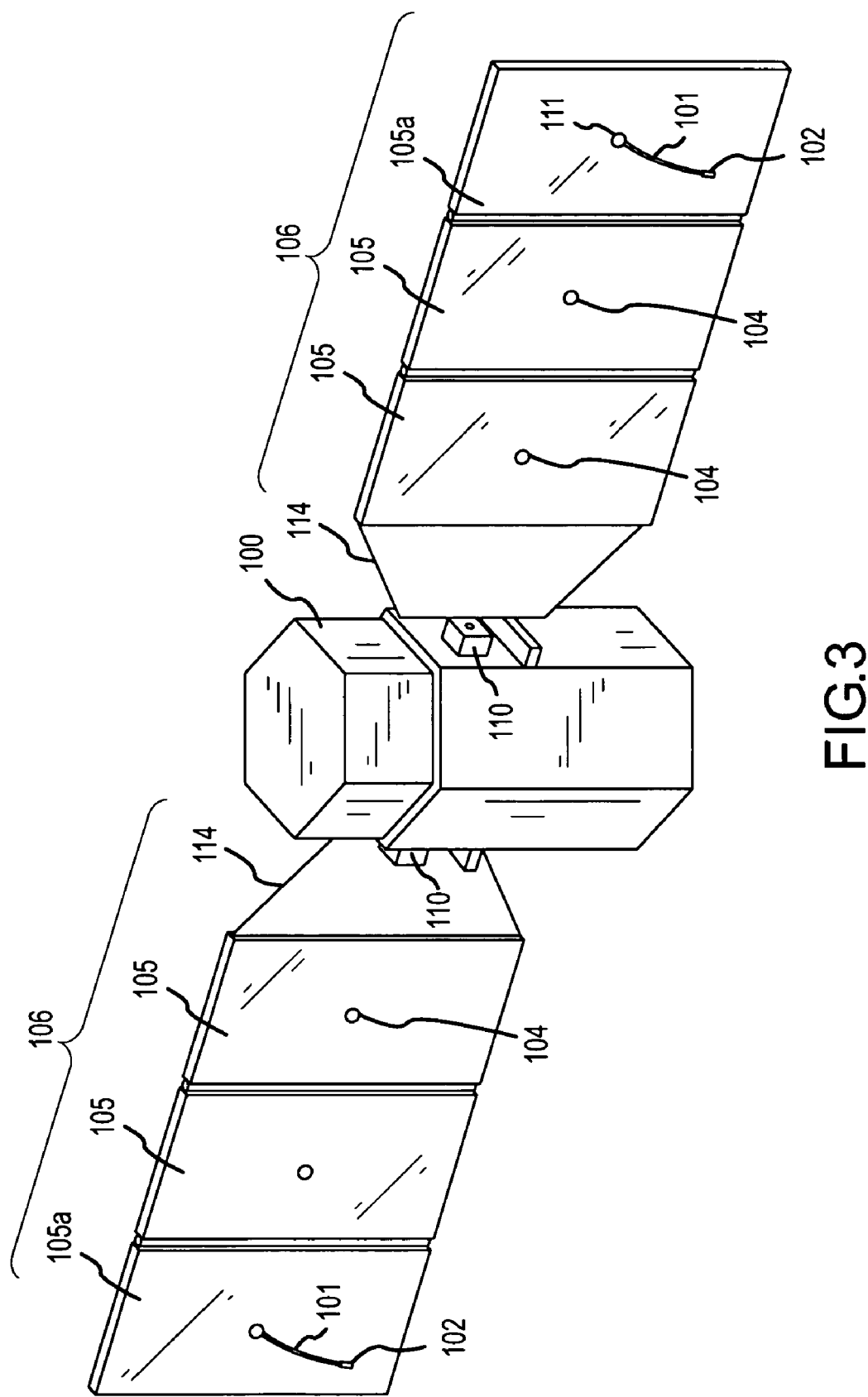
FIG. 3 is a perspective view of the spacecraft of FIG. 1a with the panels fully deployed and illustrating a remaining portion of a cable severed by the cable restraint/deployment mechanism.

FIG. 3 is a perspective view of spacecraft 100 of FIG. 1 with the panels 105 fully deployed and illustrating a remaining portion of cable 101 severed by cable restraint/deployment mechanism 110. As described in FIG. 2, cable restraint/deployment mechanism 110 severs cable 101 at the swaged sleeve 102 to allow the panels 105 of solar panel array 106 to deploy or unfold. As the panels 105 unfold, the portion of the cable 101 that is affixed to the outermost panel 105a of the array 106 pulls through guide holes 104. The remaining portion of cable 105 tends to project outward from the outermost panel as stated in the discussion of FIG. 2.

FIGS. 1a, 2 and 3 illustrate an embodiment that deploys a solar panel array 106 of a spacecraft 100. The invention, however, is not intended to be limited to such deployments. For example, cable restraint/deployment mechanism 110 and its associated swaged sleeve cable 101 may be used to deploy or release other objects. Examples of such objects include, but are not limited to, farings of a bus (i.e., a rocket), antenna arrays, spacecraft (e.g., satellites), telescopes, sensors, solar sails, radioactive generators, probes, specimen cups. Those skilled in the art are familiar with such objects.

Figure 4:
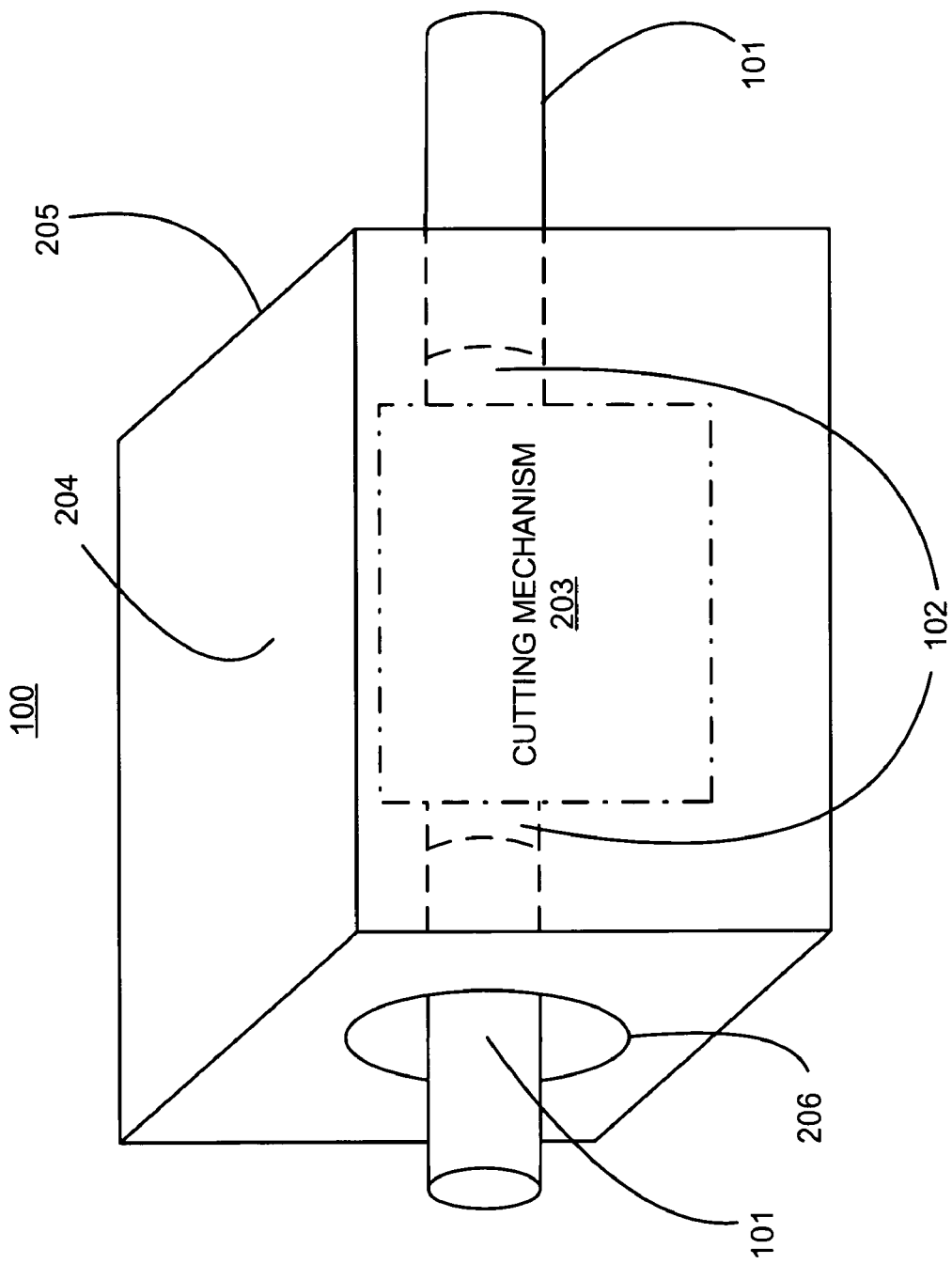
FIG. 4 represents a cutting chamber with the cable of FIG. 3 guided through the chamber and through a cutting device housed within the chamber.

FIG. 4 represents cutting chamber 205 with cable 101 of FIGS. 1a and 1b guided through chamber 205 and through cutting mechanism 203 housed within chamber 205. In this embodiment, cutting chamber 205 is affixed to the body of spacecraft 100 and is used to control the cutting environment wherein cutting mechanism 203 cuts cable 101. For example, cutting chamber 205 may be used to shelter cutting mechanism 203 from space debris. Cutting chamber 205 may also be used to substantially prevent debris from escaping cutting chamber 205; such debris may result from the cutting of cable 101. Together, cutting chamber 205, cable 101 and cutting mechanism 203 form cable restraint/deployment mechanism 110 of FIG. 1.

Cable 101 is guided through chamber 205 via guide holes 206. Guide holes 206 are similar to those used in solar panel arrays 106 described above. The size of the guide holes 206, including those used in solar panel arrays 106, are preferably related to the size of cable 101 with swaged sleeve 102. For example, the guide holes 206 are not significantly larger in circumference than the circumference of cable 101 with swaged sleeve 102. Accordingly, the guide holes 206 are of sufficient size to reduce the likelihood of the cable 101 being snagged by a guide hole 206 of cutting chamber 205 and allow cable 101 to thread through cutting chamber 205 after cable 101 is cut.

In a preferred embodiment, guide holes 206 are configured within two inch by two inch (i.e., 2"×2") brackets. The sleeve 102 in this preferred embodiment is a copper sleeve having a 2-4 millimeter wall thickness. The sleeve 102 is also preferably swaged onto cable 101 from a diameter of approximately 0.375 inches down to approximately 0.286 inches. The wall thickness may be additionally reduced after being swaged onto the cable 101 to a thickness of less than 1 millimeter from the outer most surface of cable 101. In addition to reducing the likelihood of the cable 101 being snagged, guide holes 206 may reduce the likelihood that debris will be released from cutting chamber 205 when cable 101 is cut because the size of guide holes 206 is so closely related to the size of the cable 101 and swaged sleeve 102.

Further reducing the likelihood of debris escaping is tape 204 surrounding cutting chamber 205. For example, cutting chamber 205 may have one or more panels, or walls, of the chamber 205, formed from tape 204. In a preferred embodiment, tape 204 is a space-rated conductive tape, such as a conductive Kapton tape, which traps debris in the cutting chamber 205 with the adhesive side of tape 204. The conductive properties of tape 204 also may advantageously discharge an electrical charge buildup on the spacecraft 206. Such tape is well-known to those skilled in the art.

To cut cable 101, cable 101 is positioned for cutting within cutting chamber 205 such that cutting mechanism 203 cuts through cable 101 at sleeve 102. The swaged sleeve 102 as described hereinabove maintains the integrity of cable 101 by substantially preventing splaying of cable 101 when cable 101 is cut. A more detailed view of cutting mechanism 203 is shown and described below in FIG. 5. An example of cable 101 with a swaged sleeve 102 is shown and described in greater detail and FIGS. 6 and 7.

Figure 5:
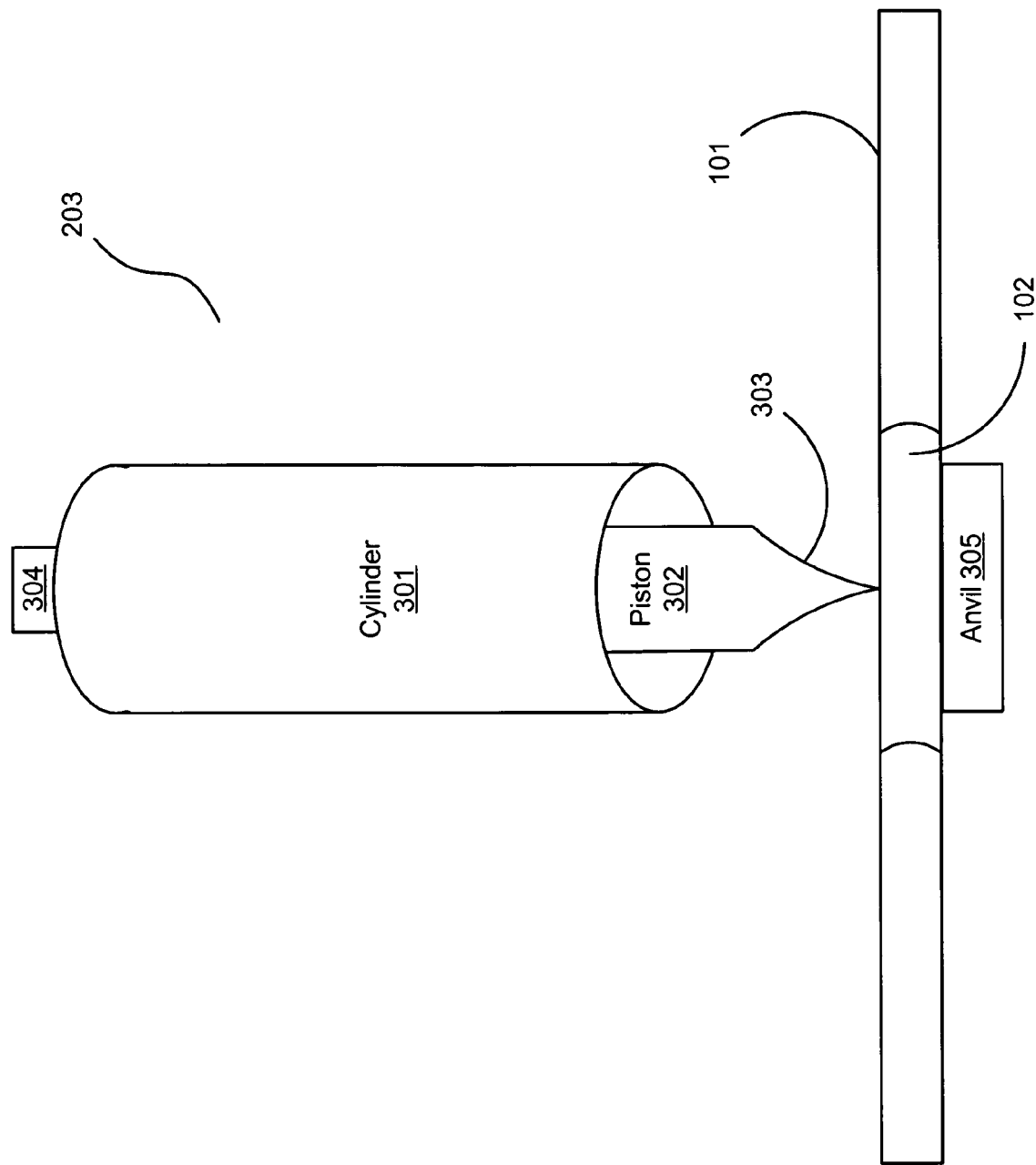
FIG. 5 represents a cutting device used to cut the cable of FIG. 3.

FIG. 5 illustrates further details regarding cutting mechanism 203 for cutting cable 101 of FIG. 3. In this embodiment, cutting mechanism 203 is configured as a pyrotechnically actuated cutting device that includes cylinder 301 and piston 302. An explosive actuator 304 forces piston 300 through cylinder 301 towards anvil 305. Piston 302 is configured with a bladed portion 303 that cuts through the cable 101 (at swaged sleeve 102, such that bladed portion 303 cuts through both sleeve 102 and cable 101) when sufficient force is applied to the piston 302. For example, when explosive actuator 304 actuates piston 302, the force of piston 302 against anvil 305 is sufficient to cut cable 101.

Also shown in this embodiment is sleeve 102 swaged onto a portion of cable 101. As described above, cutting system 300 is configured for cutting cable 101 at swaged sleeve 102. Sleeve 102 is swaged onto the cable 101 with a force sufficient to create a mechanical bond that may be stronger than the material of sleeve 102 itself. For example, the force required to remove sleeve 102 from cable 101 would tear sleeve 102 from the cable 101.

The swaging process used to swage sleeve 102 onto cable 101 essentially "crimps" sleeve 102 onto cable 101. The swaging process and the resultant mechanical bond operate to maintain the integrity of cable 101 when cutting mechanism 203 cuts through the cable 101 at the sleeve 102. For example, typical physical cutting mechanisms used for cutting a wire rope cable often result in splaying of the cable. Prior methods attempted to maintain the integrity of the cable by applying solder to a portion of the cable at the point where the cutting mechanism was to sever the cable. These methods were moderately effective at preventing the cable from substantially splaying and/or reducing debris. Sleeve 102, however, operates to hold the wires of cable 101 together and prevent the wires from splaying while substantially reducing debris when cutting mechanism 203 severs the cable.

While one embodiment has been shown and described in physical cutting mechanism 203, other physical cutting devices may be similarly suited for cutting cable 101. For example, the cutting devices described in the '506 patent may also sufficiently sever cable 101 at sleeve 102. Accordingly, the invention is not intended to be limited to physical cutting mechanism 203 shown and described herein. More specifically, invention is not intended to be limited to a pyrotechnically actuated physical cutting mechanism (i.e., an explosive charge actuated cutting device).

Figure 6:
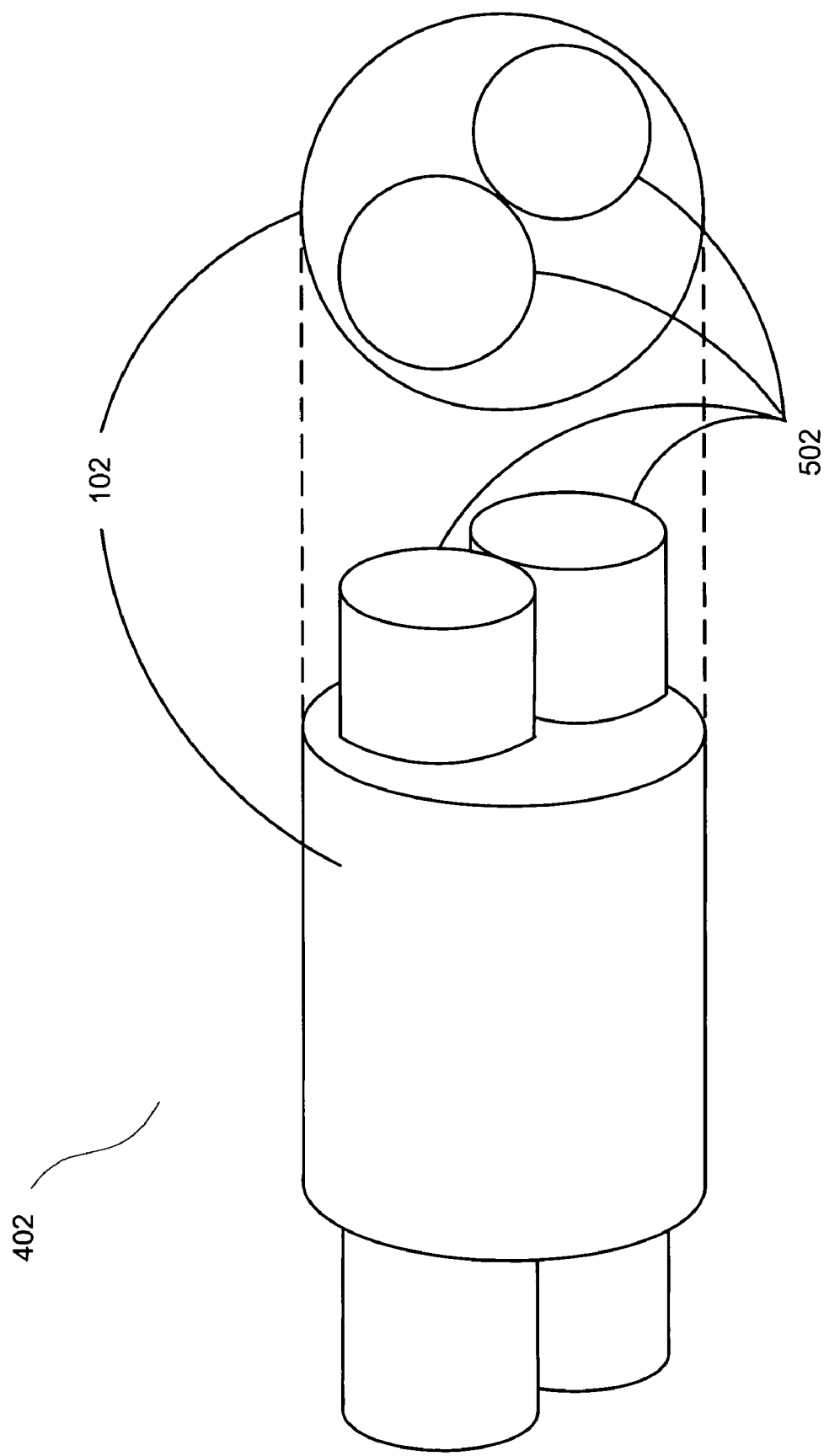
FIG. 6 represents the cable of FIG. 3 having a sleeve swaged onto a portion of the cable.

FIG. 6 presents one representative configuration for cable 101 of FIG. 3 having a sleeve 102 swaged onto a portion of cable 101 and is identified by reference numeral 402. Sleeve 102 is swaged onto cable 402 in accordance with the foregoing. In this embodiment, cable 402 is a wire rope cable configured, for illustrative purposes, from a pair of metal wires 502. Any appropriate number of wires 502 may be utilized. Sleeve 102 is swaged onto cable 402 with a force sufficient to crimp sleeve 102 in such a way that sleeve 102 interfaces with metal wires 502 and forms a mechanical bond. That is, the sleeve 102 is deformed onto the gap defined by adjacent wires 502. For example, a hydraulic press forming die may crimp sleeve 102 tightly about the interfacing surfaces of wires 502. In one embodiment, sleeve 102 is a malleable metal, preferably copper.

The swaging process used to swage sleeve 102 onto the wires 502 creates a mechanical bond between the sleeve 102 and the wires 502 of cable 402 that may be stronger than the material of sleeve 102 itself. For example, the mechanical bond created between a copper sleeve and a steel wire rope cable of the preferred swaging process would be stronger than the copper sleeve itself. Accordingly, attempting to remove sleeve 102 would result in "tearing" sleeve 102 from cable 402. Those skilled in the art are familiar with swaging processes and their associated mechanisms used to implement those processes, such as hydraulic press forming dies.

The two-wire embodiment shown and described herein is only exemplary in nature. Those skilled in the art are familiar with wire rope cables and their various configurations. For example, a wire rope cable may be a "cable-laid wire rope" cable that consists of a plurality of wire ropes, wherein each wire rope forming the cable-laid wire rope cable includes a plurality of wire strands. Accordingly, wire rope cable selection is typically a matter design choice that involves decisions regarding, among other things, break strength, weight, bending stress and/or elastic limit of the cable. Break strength, weight, bending stress and/or elastic limit of the cable are terms that are well-known to those skilled in the art. It is for at least these reasons that the invention should only be limited to language recited in the claims and their equivalents.

Figure 7B:
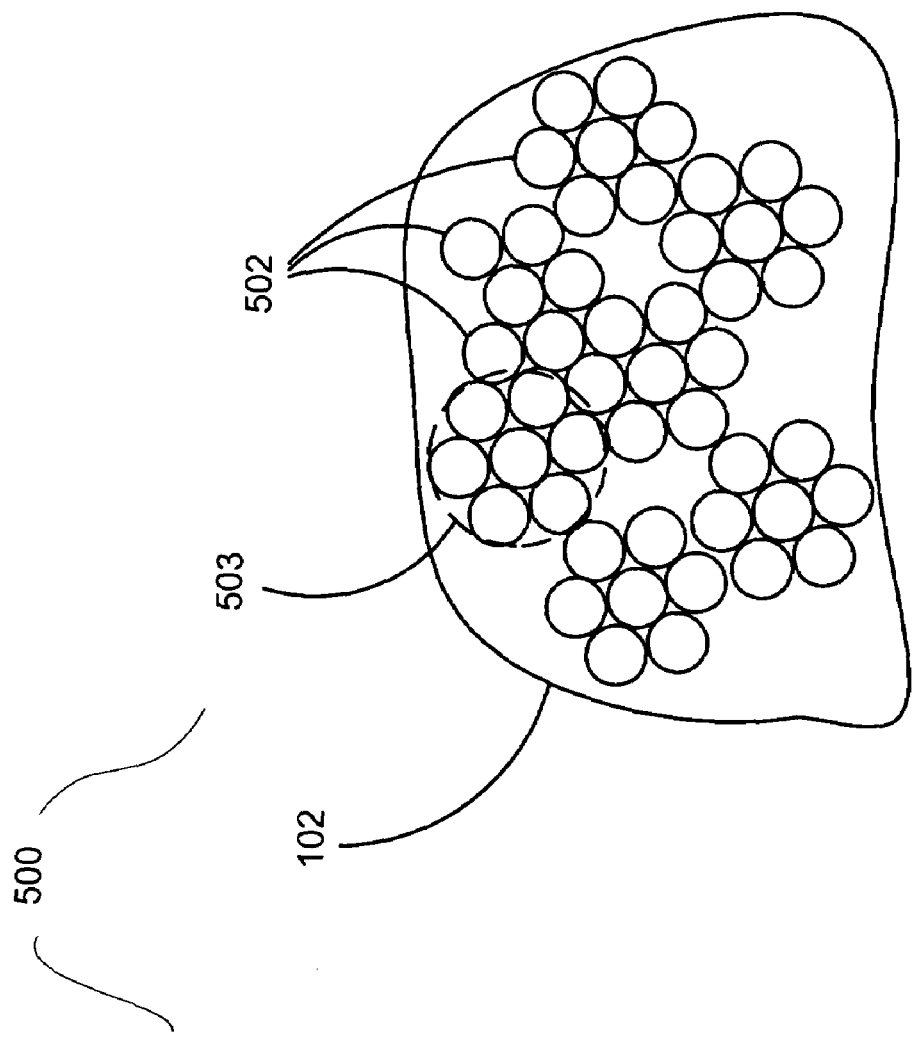
FIGS. 7a and 7b are end views of a multi wire rope cable of FIG. 3 with a sleeve swaged onto a portion of the cable.
Figure 7A:
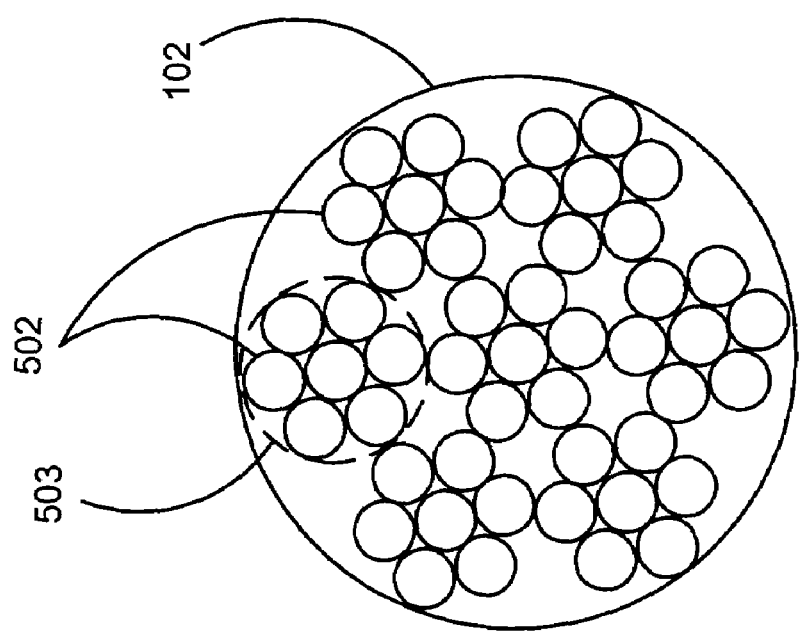

FIGS. 7a and 7b are end views of a multi wire rope cable 500 of FIG. 3 with a sleeve 102 swaged onto a portion of the cable 500, and is identified by reference number 500. Sleeve 102 is swaged onto cable 500 in accordance with the forgoing. FIG. 7a illustrates cable 500 before cable 500 is physically cut, whereas FIG. 7b illustrates cable 500 after being cut. Cable 500 of this exemplary embodiment is illustrated as a 7×7 wire rope cable comprising a plurality of ropes (e.g., rope 503 illustrated as a dotted line surrounding a plurality of wire strands 502). 7×7 as is known those skilled in the art refers to the number of ropes in cable 500 (i.e., seven in this illustrated embodiment) and the number of strands per rope (i.e., seven in this illustrated embodiment). Any appropriate number of wire ropes may be utilized and any appropriate number of wires 502 may be used for rope 503. Sleeve 102 is swaged onto cable 500 to create a mechanical bond between sleeve 102 and a plurality of wire strands 502 of cable 500 that interface with sleeve 102. That is, the sleeve 502 is deformed onto the gap between adjacent wires 502 of a given rope 503, and furthermore is deformed onto the gap between adjacent ropes 503. The process used to swage sleeve 102 onto cable 500 is preferably performed using a hydraulic press forming die that tightly crimps the sleeve 102 onto cable 500. For example, the swaging process of the preferred embodiment compresses a copper sleeve having a wall thickness of approximately 2 millimeters and a diameter of approximately 0.375 inches onto cable 500. After swaging sleeve 102 onto cable 500, the wall thickness of sleeve 102 may be reduced to a wall thickness of about 1 millimeter and a resultant diameter of about 0.286 inches.

Additionally, the swaging process described herein creates a mechanical bond between sleeve 102 and the wires 502 of cable 500 that interface with sleeve 102. The mechanical bond created by this swaging process may be stronger than the material of sleeve 102 itself. For example, after sleeve 102 is swaged onto cable 500, the strength of the mechanical bond would require tearing sleeve 102 to remove sleeve 102 from cable 500. This mechanical bond advantageously results in a wire restraint band that maintains the integrity of wire rope cable 500 when a force is applied to sleeve 102 to cut through the same and the cable 500 contained therein.

FIG. 7b illustrates a representative result of such a force applied to sleeve 102. For example, a physical cutting device, such as pyrotechnically actuated cutting mechanism 203 of FIG. 5, applies such a force when it cuts wire rope cable 500 at sleeve 102. The force results in a deformation of cable 500 when cable 500 is cut at swaged sleeve 102. However, the integrity of cable 500 is maintained because the swaged sleeve 102 substantially restrains individual ropes 503 and the associated wire strands 502 from splaying (i.e. unraveling).

In general, uncontrolled splaying of a wire rope cable can damage certain delicate components, such as those employed by a spacecraft. For example, the wires and ropes of a wire rope cable are typically formed of steel and are therefore stiff. When a splayed wire rope cable is pulled through, for example, solar panel array 106 as described hereinabove, the wires and/or ropes of the cable can fracture components of the array. The splayed end of the cable may also snag on nearby spacecraft components, thereby inhibiting or preventing deployment. Additionally, the naturally conductive wire rope cable may discharge electrical current to sensitive electronic devices, such as solar cells in the array, and thereby damage those devices.

The aspects of the present invention described hereinabove serve to substantially prevent such uncontrolled splaying of the wire rope cable by employing a swaged sleeve. Although useful in substantial prevention of cable splaying, other aspects of the invention include the substantial reduction of debris when a wire rope cable is cut at the sleeve. For example, prior methods of maintaining wire rope cable integrity included soldering the cable. These methods were marginally useful at reducing splaying of the cable; however, a substantial amount of debris from the solder was created when the cable was cut. Such debris is typically conductive and can, therefore, cause unwanted electrical current to discharge to sensitive electronic devices. Sleeve 102 of the preferred embodiment substantially eliminates debris when the cable is cut because, among other reasons, copper is less prone than solder materials to become a particulate when it is cut. These advantages amount to a mechanical purchase produced by the process used to swage sleeve 102 onto cable 500.

While multiple swaged-sleeve cable embodiments have been shown and described, those skilled in the art should readily recognize that the invention is not intended to be limited to this exemplary embodiment. For example, those skilled in the art may use other types of wire rope cables and/or swaging processes than those described hereinabove. Such alternatives are often a matter design choice.

Figure 8:
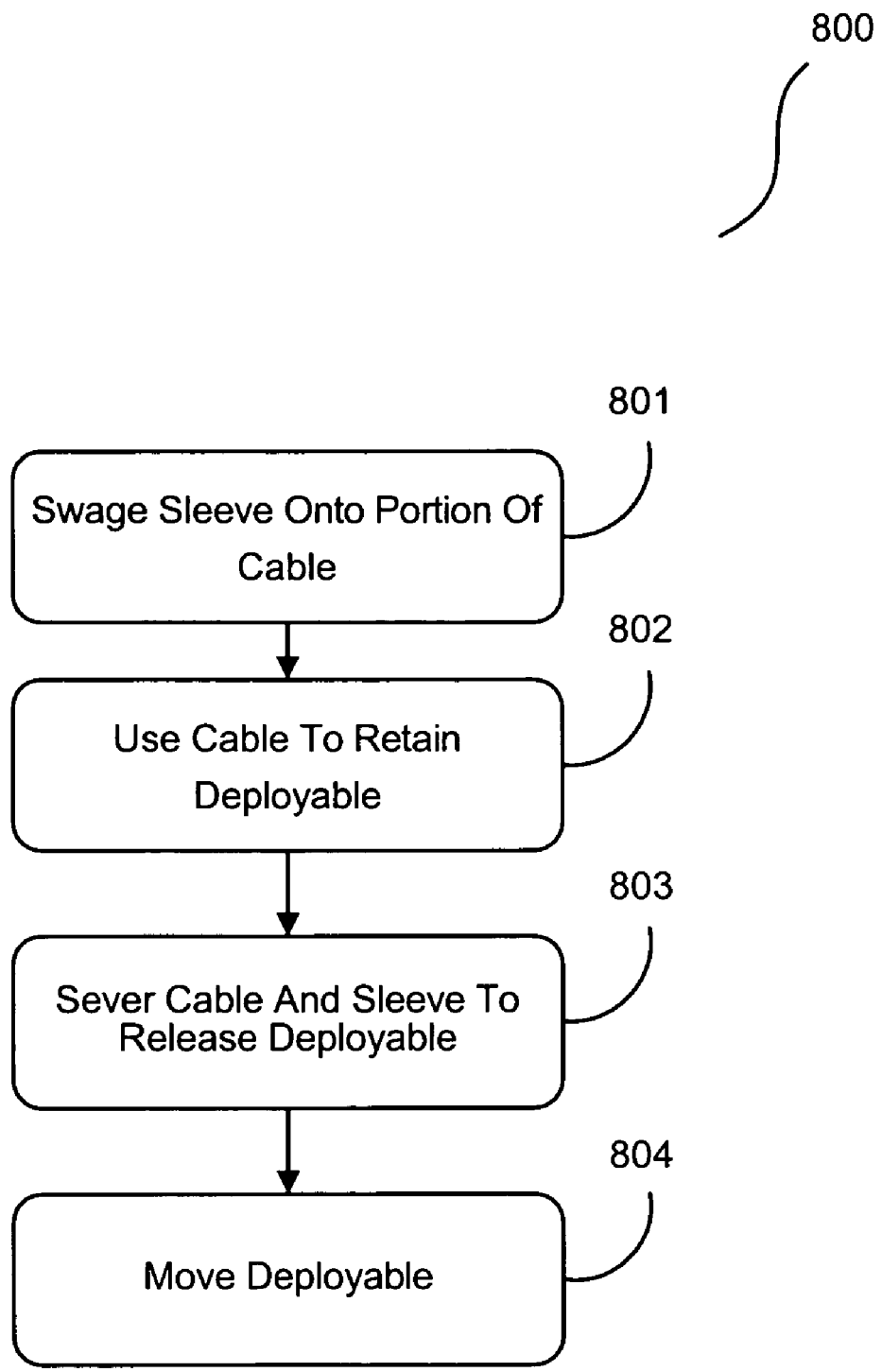
FIG. 8 is a flowchart of a spacecraft operation.

FIG. 8 is flowchart 800 of a spacecraft operation in one methodical embodiment. In this embodiment, a sleeve (e.g., sleeve 102 hereinabove) is swaged onto a portion of a cable (e.g., cable 101 hereinabove) used in space, in element 801. The sleeve may be formed from a malleable metal, such as copper. The swaging process may compress the malleable metal sleeve onto an exterior surface of the cable, thereby deforming the sleeve against the exterior surface.

In one preferred embodiment, a hydraulic press forming die is used to swage the sleeve onto the cable. The die may compress the sleeve onto the cable with such force so as to create a mechanical bond between the sleeve and the cable that may be stronger than the material itself. For example, the force required to break the mechanical bond and thereby remove the sleeve from the cable may be greater than the force required to destroy the material of the sleeve. Accordingly, an attempt to remove the sleeve from the cable would result in tearing the sleeve. Additionally, since the swaging process is a mechanical bonding process, the process can be performed with less cleaning than the prior solder bonding processes. More specifically, the swaging process may eliminate the need of an ODC to clean a cable.

Once the sleeve is swaged onto the cable, the original wall thickness of the sleeve may be reduced. For example, a copper sleeve having a wall thickness of 2 millimeters may be swaged onto the cable and the wall thickness substantially reduced to less than 1 millimeter. The sleeve may also have a diameter of approximately 0.375 inches that is reduced to approximately 0.286 inches.

With the sleeve swaged onto the cable, the cable can be used to retain a deployable, in element 802, until deployment. For example, the deployable may be restrained by a cable restraint/deployment mechanism as described hereinabove. Once a determination is made to deploy the deployable, the cable is severed at the sleeve by a physical cutting mechanism such as that described hereinabove, in element 803. The physical cutting mechanism cuts through the sleeve and the cable to separate the deployable from spacecraft restraint. The deployable is then moved from the spacecraft, in element 804. This motion may constitute an entire separation of the deployable from the spacecraft, such as that of a spacecraft separating from a faring or a bus deploying a spacecraft. In a preferred embodiment, however, the motion constitutes an operable connection between the deployable and the spacecraft, such as that involved with a deployment of a solar panel array and/or an antenna of the spacecraft.

The foregoing description of the present invention has been presented for purposes of illustration and description. Furthermore, the description is not intended to limit the invention to form disclosed herein. Consequently, variations and modifications commensurate with the above teachings, and skill and knowledge of the relevant art, are within the scope of the present invention. The embodiments described hereinabove are further intended to explain best modes known as practicing the invention and to enable others skilled in the art to utilize the invention in such, or other embodiments and with various modifications required by the particular application(s) or use(s) of the present invention. It is intended that the appended claims, therefore, be construed to include alternative embodiments to the extent permitted by the prior art.

APPENDIX

The prior methods of maintaining cable integrity included soldering a portion of the cable to restrain the cable from splaying. However these methods are becoming prohibitively costly and complex due to the restrictions on ODCs used to clean the wire rope cables. Regardless, these methods created a substantial amount of debris when the cable was cut because the solder tends to break into particulates from the force of the cutting device. This debris can cause damage to a spacecraft, particularly to electrical components of the spacecraft because the solder is conductive.

The present invention avoids the shortcomings of the prior art because the swaged sleeve substantially decreases the amount of debris and splaying when the wire rope cable is cut. For example, space flight testing has shown that a cable cutting system using the swaged wire rope cable substantially reduces the debris and splaying when the cable was cut. This space flight testing occurred on Jul. 17, 2003 after launch of the Rainbow-1 spacecraft from Cape Canaveral, Fla. During this operation, a communications satellite was launched into orbit and solar panel arrays of the spacecraft were subsequently deployed using a cable restraint/deployment mechanism in accordance with FIGS. 1a and 2-5.

The cable restraint/deployment mechanism cut the wire rope cable at the swaged sleeve, thereby severing the restraint between the solar panel arrays and the spacecraft. The severance of the cable allowed for the panels to deploy by unfolding. The portion of the cable that remained with the spacecraft was essentially forced back into a cable reeling mechanism of the spacecraft. As the panels unfolded, a severed portion of the cable remained affixed to an outermost panel of the array. The length of the portion affixed to the outermost panel is substantially that length from the outermost panel to the physical cutting device. For example, the reeling mechanism of the spacecraft restrained the panels because one end of the cable was affixed through the panels of the array to an outermost panel of the array. The sleeve was swaged about a portion of the wire rope cable and positioned at the anvil/blade of the physical cutting device when threaded through the cutting chamber. As such, one portion of the wire rope cable was forced into the reeling mechanism and the other portion remained affixed to the outermost panel when the cable was cut at the sleeve.

Because the sleeve substantially prevented the splaying of the wire rope cable when cut, the portion of the cable that remained affixed to the outermost panel of the solar panel array did not damage components of the array. For example, as the solar panel array unfolded, a splayed cable could have ruptured components of the array due to the uncontrollable unraveling of the wires forming the cable or snagged on nearby components, thereby inhibiting deployment. Accordingly, the swaged sleeve cable is a space-flight proven component that reduces the potential for such damage. Additionally, the swaged cable was also effective at reducing debris. Again, debris may cause either physical or electrical damage to the spacecraft and/or the solar panel array.

What is claimed is:

1. A spacecraft, comprising:
   a spacecraft body;
   a deployable releasably interconnected with said spacecraft body;
   a cable that interfaces with said deployable to retain said deployable in a first position;
   a sleeve, wherein said cable extends through said sleeve, and wherein said sleeve is swaged onto said cable; and
   a cutting device aligned with said sleeve, wherein activation of said cutting device directs said cutting device through both said sleeve and said cable to release said deployable from said first position.

2. The spacecraft of claim 1, wherein said deployable moves from said first position to a second position, and remains interconnected with said spacecraft body, after said activation of said cutting device.

3. The spacecraft of claim 1, wherein said deployable is jettisoned from said spacecraft body after said activation of said cutting device.

4. The spacecraft of claim 1, wherein said sleeve comprises a material selected from a group consisting of: copper; a malleable metal; and an extrudable substance.

5. The spacecraft of claim 1, wherein said deployable is selected from a group consisting of: an antenna; a solar panel; a faring; a satellite; a telescope; a sensor; a solar sail; a radioactive generator; a probe; and a specimen cup.

6. The spacecraft of claim 1, wherein swaging said sleeve onto said cable allows said cable to be severed with substantially no splaying.

7. The spacecraft of claim 1, wherein swaging said sleeve onto said cable allows said cable to be severed with substantially no debris being generated.

8. The spacecraft of claim 1, wherein swaging said sleeve onto said cable deforms said sleeve into intimate contact with an exterior surface of said cable.

9. The spacecraft of claim 1, wherein said cable is a wire rope cable comprising a plurality of individual wires, and wherein swaging said sleeve onto said cable provides a mechanical bond between said wires and said sleeve.

10. The spacecraft of claim 9, wherein said mechanical bond is stronger than a material of said sleeve and wherein a force required to pull said sleeve from said cable results in a tear of said material.

11. The spacecraft of claim 9, wherein said mechanical bond is achieved without using an ozone-depleting chemical on said cable.

12. A method of operating a spacecraft, comprising steps of:
    swaging a sleeve onto a cable;
    using said cable to retain a deployable in a first position relative to said spacecraft;
    severing both said sleeve and said cable; and
    releasing said deployable from said first position in response to said step of severing.

13. The method of claim 12, wherein said step of swaging comprises a step of compressing said sleeve onto an exterior surface of said cable.

14. The method of claim 12, wherein said step of swaging comprises a step of deforming said sleeve against an exterior surface of said cable.

15. The method of claim 12, further comprising a step of reducing a wall thickness of said sleeve.

16. The method of claim 12, wherein said step of swaging comprises a step of providing a mechanical purchase between said sleeve and said cable.

17. The method of claim 12, wherein said step of swaging is executed such that said sleeve is retained on said cable after said step of swaging and such that a force required to remove said sleeve from said cable results in a tear of said sleeve.

18. The method of claim 12, wherein said step of swaging is executed with a hydraulic press forming die.

19. The method of claim 12, wherein said step of swaging requires no step of cleaning of said cable with an ozone-depleting chemical.

20. The method of claim 12, wherein said step of severing is executed generating substantially no debris.

21. The method of claim 12, wherein said step of severing is executed generating substantially no splaying of said cable.

22. The method of claim 12, further comprising a step of moving said deployable from said first position to a second position after said step of releasing.

23. The method of claim 12, wherein said step of releasing comprises disconnecting said deployable from said spacecraft.

24. The method of claim 12, wherein said deployable is selected from the group consisting of:
    an antenna; a solar panel; a faring; a satellite; a telescope; a sensor; a solar sail; a radioactive generator; a probe; and a specimen cup.

25. A method of operating a spacecraft, comprising steps of:
    retaining a deployable in a first position relative to said spacecraft with a cable having a swaged sleeve; and
    deploying said deployable by
    severing both said swaged sleeve and said cable, and releasing said deployable from said first position in response to said step of severing.

26. The method of claim 25, wherein said step of severing comprises a step of generating at least one severed end of said cable with substantially no splaying.

27. The method of claim 25, wherein said step of severing comprises a step of producing substantially no debris.

28. The method of claim 25, further comprising a step of swaging said swaged sleeve onto said cable to generate a mechanical bond between said swaged sleeve and said cable, wherein the mechanical bond is stronger than a material of said swaged sleeve.

29. The method of claim 25, further comprising guiding a severed said cable through a guide hole of a deployable, wherein said guide hole has a size of about said cable with said swaged sleeve.

30. A method of deploying an object in space, comprising steps of:
  guiding a cable through a cutting mechanism, wherein said cutting mechanism is affixed to a spacecraft and wherein said cable has a swaged portion;
  firing a cutting blade against said swaged portion of said cable;
  severing said cable to provide a first severed end of said cable with a first part of said swaged portion, wherein severing produces substantially no splaying of said cable; and
  moving said object from said spacecraft in response to said step of severing said cable.

31. A system for operating a spacecraft, comprising:
  a swaged cable;
  means for using said swaged cable to retain a deployable in a first position relative to said spacecraft;
  means for severing both a sleeve swaged onto said swaged cable and said swaged cable; and
  means for releasing said deployable from said first position responsive to said means for severing.

32. The system of claim 31, further comprising means for compressing said sleeve onto an exterior surface of said swaged cable.

33. The system of claim 31, further comprising means for deforming said sleeve against an exterior surface of said swaged cable.

34. The system of claim 31, further comprising means for reducing a wall thickness of said sleeve.

35. The system of claim 31, further comprising means for providing a mechanical purchase between said sleeve and said swaged cable.

36. The system of claim 31, further comprising means for swaging said sleeve onto said swaged cable such that said sleeve is retained on said swaged cable after said swaging and such that a force required to remove said sleeve from said swaged cable results in a tear of said sleeve.

37. The system of claim 36, further comprising means for swaging said sleeve onto said swaged cable with a hydraulic press forming die.

38. The system of claim 36, wherein said means for swaging requires no cleaning with an ozone-depleting chemical.

39. The system of claim 31, wherein said means for severing comprises means for cutting through both said sleeve and said swaged cable.

40. The system of claim 31, wherein said means for severing is executed generating substantially no debris.

41. The system of claim 31, wherein said means for severing is executed generating substantially no splaying of said swaged cable.

42. The system of claim 31, further comprising means for moving said deployable from said first position to a second position in response to releasing said deployable.

43. The system of claim 31, wherein said means for releasing comprises means for disconnecting said deployable from said spacecraft.

44. The system of claim 31, wherein said deployable is selected from the group consisting of:
  an antenna; a solar panel; a faring; a satellite; a telescope; a sensor; a solar sail; a radioactive generator; a probe; and a specimen cup.

\* \* \* \* \*